(12) United States Patent
Lu et al.

(10) Patent No.: US 12,262,407 B2
(45) Date of Patent: Mar. 25, 2025

(54) CHANNEL QUALITY FEEDBACK METHOD AND APPARATUS

(71) Applicant: GUANGDONG OPPO MOBILE TELECOMMUNICATIONS CORP., LTD., Guangdong (CN)

(72) Inventors: Qianxi Lu, Dongguan (CN); Zhenshan Zhao, Dongguan (CN); Huei-Ming Lin, South Yarra (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 362 days.

(21) Appl. No.: 17/733,908

(22) Filed: Apr. 29, 2022

(65) Prior Publication Data

US 2022/0256545 A1 Aug. 11, 2022

Related U.S. Application Data

(63) Continuation of application No. PCT/CN2019/115926, filed on Nov. 6, 2019.

(51) Int. Cl.
*H04W 72/563* (2023.01)
*H04L 1/1812* (2023.01)
(Continued)

(52) U.S. Cl.
CPC ......... *H04W 72/563* (2023.01); *H04L 1/1812* (2013.01); *H04W 72/0446* (2013.01);
(Continued)

(58) Field of Classification Search
None
See application file for complete search history.

(56) References Cited

U.S. PATENT DOCUMENTS

| 2013/0322276 A1 | 12/2013 | Pelletier et al. |
| 2014/0241262 A1 | 8/2014 | Novak et al. |

(Continued)

FOREIGN PATENT DOCUMENTS

| CN | 103702346 A | 4/2014 |
| CN | 108631935 A | 10/2018 |

(Continued)

OTHER PUBLICATIONS

International Search Report (ISR) dated Jul. 24, 2020 for Application No. PCT/CN2019/115926.

(Continued)

*Primary Examiner* — Christine T Duong
(74) *Attorney, Agent, or Firm* — Ladas & Parry, LLP

(57) ABSTRACT

The present application discloses a channel quality feedback method and apparatus. The method includes: a first terminal receives indication information sent by a second terminal, where the indication information is used to instruct the first terminal to send a channel quality indicator and/or a rank indicator to the second terminal. The first terminal generates a media access control layer control element (MAC CE), where the MAC CE includes the channel quality indicator and/or the rank indicator. The first terminal sends the MAC CE to the second terminal. The first terminal sends the MAC CE including the channel quality indicator and/or the rank indicator to the second terminal, so that the channel quality feedback of the first terminal to the second terminal is completed through the channel quality indicator and/or the rank indicator, thereby realizing the channel quality feedback between terminals.

18 Claims, 5 Drawing Sheets

(51) Int. Cl.
*H04W 72/0446* (2023.01)
*H04W 72/20* (2023.01)
*H04W 72/542* (2023.01)
*H04W 72/56* (2023.01)
*H04W 80/02* (2009.01)

(52) U.S. Cl.
CPC ......... *H04W 72/20* (2023.01); *H04W 72/542* (2023.01); *H04W 72/56* (2023.01); *H04W 80/02* (2013.01)

(56) References Cited

U.S. PATENT DOCUMENTS

| | | | |
|---|---|---|---|
| 2017/0347394 A1 | 11/2017 | Yasukawa et al. | |
| 2018/0102817 A1* | 4/2018 | Park | H04B 7/0417 |
| 2018/0220439 A1 | 8/2018 | Lee et al. | |
| 2020/0022089 A1* | 1/2020 | Guo | H04W 52/26 |
| 2021/0099901 A1* | 4/2021 | Huang | H04W 72/12 |

FOREIGN PATENT DOCUMENTS

| | | |
|---|---|---|
| CN | 109429259 A | 3/2019 |
| CN | 109644455 A | 4/2019 |
| JP | 2021078111 A | 5/2021 |
| WO | 2019128261 A1 | 7/2019 |
| WO | 2021087799 A1 | 5/2021 |

OTHER PUBLICATIONS

Written Opinion (WOSA) dated Jul. 24, 2020 for Application No. PCT/CN2019/115926.
Ericsson, 3GPP TSG-RAN WG1 Meeting #98bis R1-1910538, PHY layer procedures for NR sidelink, Chongqing, China, Oct. 14-20, 2019, entire document.
NTT Docomo, Inc. 3GPP TSG RAN WG1 #98bis R1-1911173; Sidelink physical layer procedure for NR V2X, Chongqing, China, Oct. 14-20, 2019, entire document.
Ericsson. 3GPP TSG-RAN WG2 #107bis R2-1913330; Discussion on NR SL lower layer procedures, Chongqing, China, Oct. 14-18, 2019, entire document.
Huawei, HiSilicon, 3GPP TSG RAN WG1 Meeting #98bis R1-1910059; Sidelink physical layer procedures for NR V2X, Chongqing, China, Oct. 14-20, 2019, entire document.
Ericsson. 3GPP TSG-RAN WG1 Meeting #97 R1-1907143; PHY layer procedures for sidelink, Reno, US, May 13-17, 2019, entire document.
Vodafone, 3GPP TSG RAN Meeting #80 RP-181429; New SID: Study on NR V2X, La Jolla, USA, Jun. 11-14, 2018, entire document.
The first Office Action of corresponding Chinese application No. 202210432199.X, dated May 25, 2023 with search report, and it English translation.
The second Office Action of corresponding Chinese application No. 202210432199.X, dated Jul. 26, 2023, and its English translation.
The first Office Action of corresponding Japanese application No. 2022-526261, dated Oct. 3, 2023.
The Extended European Search Report of corresponding European application No. 23190043.2 dated Oct. 17, 2023.
The Rejection of corresponding Chinese application No. 202210432199.X dated Oct. 10, 2023.
OPPO, "Left issues on CSI report for NR-V2X", R2-1914462;3GPP TSG-RAN WG2 Meeting #108; Reno, US, Nov. 18-Nov. 22, 2019.
Samsung, "On Physical Layer Procedures for NR V2X", R1-1906941; 3GPP TSG RAN WG1 #97; Reno, USA, May 13-17, 2019.
Ericsson, "Discussion on NR SL lower layer procedures"; R2-1913330; GPP TSG RAN WG2 #107bis Chongqing, China, Oct. 14-18, 2019.
The first Office Action of corresponding Indian application No. 202217029947, dated Sep. 22, 2022.
LG Electronics, "Feature lead summary #2 for AI 7.2.4.5 Physical layer procedures for sidelink", R1-1911702, 3GPP TSG RAN WG1#98bis ,Chongqing, China, Oct. 14-20, 2019. entire document.
The EESR of corresponding European application No. 19951926.5, dated Sep. 2, 2022.
The first Office Action of corresponding European application No. 23190043.2, dated Aug. 27, 2024.

* cited by examiner

CHANNEL QUALITY FEEDBACK METHOD AND APPARATUS

CROSS-REFERENCE TO RELATED APPLICATION

This application is a continuation of International Application No. PCT/CN2019/115926, filed on Nov. 6, 2019, the content of which is incorporated herein by reference in its entirety.

TECHNICAL FIELD

The present application relates to the field of communication technology, and in particular, to a channel quality feedback method and apparatus.

BACKGROUND

Device-to-device communication is a sidelink transmission technology. Device-to-device communication adopts a manner of terminal-to-terminal direct communication, and thus has higher spectrum efficiency and lower transmission delay.

However, in existing device-to-device communication, channel quality feedback cannot be carried out. Therefore, there is a technical problem that channel quality feedback cannot be carried out between devices in device-to-device communication.

SUMMARY

The present application provides a channel quality feedback method and apparatus to solve the technical problem that channel quality feedback cannot be carried out between devices in device-to-device communication.

In a first aspect, a specific embodiment of the present application provides a channel quality feedback method, including:
  receiving, by a first terminal, indication information sent by a second terminal, where the indication information is used to instruct the first terminal to send a channel quality indicator and/or a rank indicator to the second terminal;
  generating, by the first terminal, a media access control layer control element (MAC CE), where the MAC CE includes the channel quality indicator and/or the rank indicator; and
  sending, by the first terminal, the MAC CE to the second terminal.

In a second aspect, a specific embodiment of the present application provides a channel quality feedback apparatus, including:
  a receiving module, configured to receive indication information sent by a second terminal, where the indication information is used to instruct the first terminal to send a channel quality indicator and/or a rank indicator to the second terminal;
  a generating module, configured to generate a media access control layer control element (MAC CE), where the MAC CE includes the channel quality indicator and/or the rank indicator; and
  a sending module, configured to send the MAC CE to the second terminal.

In a third aspect, a specific embodiment of the present application provides a terminal device, where the terminal device includes a processor and a memory, the memory stores a transmission program which is runnable on the processor, and when the processor executes the program, any of the above channel quality feedback method is implemented.

In a fourth aspect, a specific embodiment of the present application provides a computer-readable storage medium storing a computer program, where when the computer program is executed, any of the above channel quality feedback method is implemented.

In a fifth aspect, a specific embodiment of the present application provides a computer program product, where the computer program product is stored in a non-transitory computer-readable storage medium, and when the computer program product is executed, any of the above channel quality feedback method is implemented.

In a sixth aspect, a specific implementation of the present application provides a chip including a processor, configured to call a computer program from a memory and run the computer program, and a device installed with the chip executes any of the above channel quality feedback method.

In a seventh aspect, a specific embodiment of the present application provides a computer program, and when the computer program is executed, any of the above channel quality feedback method is implemented.

The technical solutions provided by the specific embodiments of the present application may include the following beneficial effects:
  a first terminal receives indication information sent by a second terminal, where the indication information is used to instruct the first terminal to send a channel quality indicator and/or a rank indicator to the second terminal. The first terminal generates a media access control layer control element (MAC CE), where the MAC CE includes the channel quality indicator and/or the rank indicator. The first terminal sends the MAC CE to the second terminal. The first terminal sends the MAC CE including the channel quality indicator and/or the rank indicator to the second terminal, so that the channel quality feedback of the first terminal to the second terminal is completed through the channel quality indicator and/or the rank indicator, thereby realizing the channel quality feedback between terminals, and solving the technical problem that channel quality feedback cannot be carried out between devices in device-to-device communication.

It should be understood that the above general description and the following detailed description are only illustrative but do not limit the present application.

BRIEF DESCRIPTION OF DRAWINGS

The accompanying drawings herein are incorporated into the specification and constitute part of the specification, which show embodiments consistent with the present application, and are used together with the specification to explain the principle of the present application.

DESCRIPTION OF EMBODIMENTS

Here, illustrative embodiments will be described in detail, and examples thereof are shown in the accompanying drawings. When the following description relates to the accompanying drawings, unless otherwise indicated, a same number in different accompanying drawings represents same or similar elements. The embodiments described in the following illustrative embodiments do not represent all embodiments consistent with the specific embodiments of the present application. On the contrary, they are only examples of the method and apparatus consistent with some aspects of the present application as detailed in the appended claims. Based on the specific embodiments in the present application, all other specific embodiments obtained by those skilled in the art without making creative effort belong to the protection scope of the present application.

Figure 1:
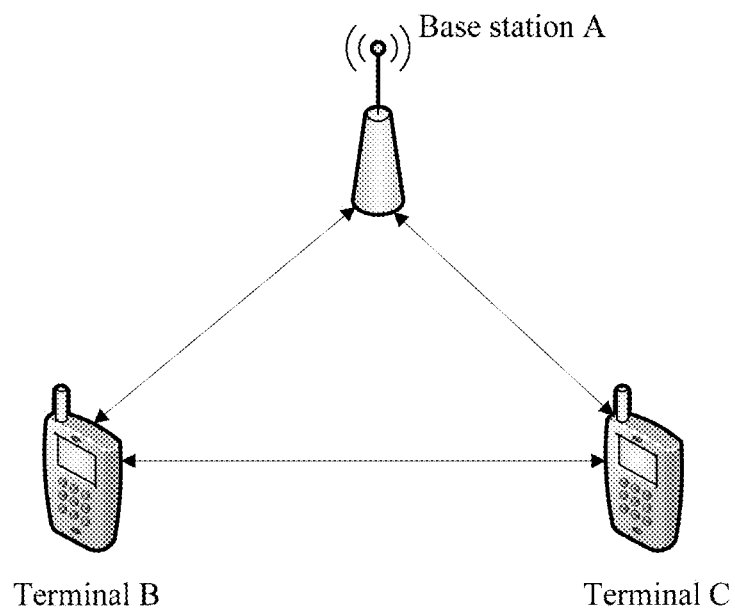
FIG. 1 is a network architecture diagram of a communication system where a specific embodiment of the present application may be applied.
Figure 2:
FIG. 2 is a network architecture diagram of a communication system where a specific embodiment of the present application may be applied.

FIG. 1 and FIG. 2 are system architecture of a communication system where the following specific embodiments of the present application in the following may be applied. The system architecture includes: a base station A, a terminal B and a terminal C.

Device-to-device communication is a sidelink transmission technology based on device-to-device (D2D), which is different from a manner in which communication data is received or sent through a base station in a traditional cellular system. Device-to-device communication adopts a manner of terminal-to-terminal direct communication, and thus, has higher spectrum efficiency and lower transmission delay. There is no design of medium access control layer control element (MAC CE) in the sidelink. In third-generation partnership project (3GPP), two transmission modes are defined: mode A and mode B.

Mode A: a transmission resource of a terminal is allocated by a base station, and the terminal performs data transmission on the sidelink according to the resource allocated by the base station; the base station may allocate a resource to the terminal for single transmission, or allocate a resource to the terminal for semi-static transmission.

Mode B: a terminal selects a resource in a resource pool for data transmission.

In device-to-device communication, communication between the terminal B and the terminal C may be performed through the base station A, or the communication between the terminal B and the terminal C may be performed directly without through the base station A. In device-to-device communication, channel quality feedback cannot be carried out between the terminal B and the terminal C. Therefore, there is a technical problem that channel quality feedback cannot be carried out between devices in device-to-device communication. The following specific embodiments of the present application will describe in detail how to carry out channel quality feedback between the terminal B and the terminal C.

In the system architecture, an example communication system may be a global system of mobile communication (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, an advanced long term evolution (LTE-A) system, a new radio (NR) system, an evolution system of NR system, an LTE-based access to unlicensed spectrum (LTE-U) system, a new radio based access to unlicensed spectrum (NR-U), a universal mobile telecommunications system (UMTS), a worldwide interoperability for microwave access (WiMAX) communication system, wireless local area networks (WLAN), wireless fidelity (WiFi), next generation communication system or other communication systems.

Generally speaking, traditional communication systems support a limited number of connections and are easy to implement. However, with the development of communication technology, mobile communication systems will not only support traditional communication, but also support, for example, device-to-device (D2D) communication, machine to machine (M2M) communication, machine type communication (MTC), vehicle to vehicle (V2V) communication, vehicle to X (V2X), etc. The embodiments of the present application may also be applied to these communication systems.

The example communication system specifically includes a network device and a terminal. When the terminal accesses a mobile communication network provided by a network device, the terminal and the network device may be communicatively connected through a wireless link. A communication connection mode may be a single-connection mode, a dual-connection mode or a multi-connection mode, but when the communication connection mode is the single-connection mode, the network device may be an LTE base station or an NR base station (also known as gNB base station), when the communication mode is the dual-connection mode (which, specifically, may be realized by carrier aggregation (CA) technology or multiple network devices), and when the terminal is connected to multiple network devices, the multiple network devices may be a primary base station MCG and a secondary base station SCG and data backhaul is performed between base stations through a backhaul link. The primary base station may be an LTE base station, and the secondary base station may be an LTE base station, or the primary base station may be an NR base station, and the secondary base station may be an LTE base station, or the primary base station may be an NR base station, and the secondary base station may be an NR base station. A receiving-side RLC entity described in the specific embodiments of the present application may be a terminal, or software (such as a protocol stack) and/or hardware (such as a modem) in the terminal. Similarly, a transmitting-side RLC entity may be a network device, or software (such as protocol stack) and/or hardware (such as a modem) in the network device.

In the specific embodiments of the present application, terms "network" and "system" are often used alternately, and those skilled in the art can understand their meaning.

The terminal involved in the specific embodiments of the present application may include various handheld devices with wireless communication function, vehicle-mounted devices, wearable devices, computing devices or other processing devices connected to wireless modems, as well as various forms of user equipment (UE), mobile station (MS) and terminal device, etc. For ease of description, the above-mentioned devices are collectively referred to as terminal.

In addition, the terms "system" and "network" herein are often used interchangeably. The term "and/or" herein is only an association relationship describing association objects, indicating that there can be three relationships, for example, A and/or B, which can mean that there are three situations: A exists alone, A and B exist at the same time, and B exists alone. In addition, the character "/" herein generally means that front and rear associated objects are in an "or" relationship.

It should be understood that in the specific embodiments of the present application, "B corresponding to A" means that B is associated with A, and B can be determined according to A. However, it should also be understood that determining B according to A does not mean determining B only according to A, which may also be determining B according to A and/or other information.

Figure 3:
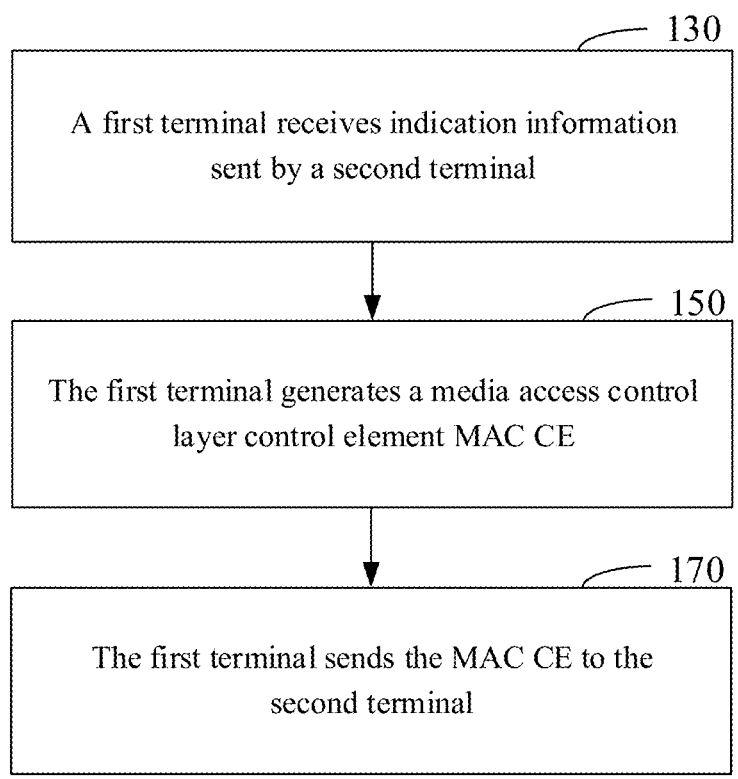
FIG. 3 is a flowchart of a channel quality feedback method according to a specific embodiment of the present application.

FIG. 3 is a flowchart of a channel quality feedback method according to a specific embodiment of the present application. As shown in FIG. 3, the channel quality feedback method may include the following steps.

In step 130, a first terminal receives indication information sent by a second terminal.

The first terminal is a receiving terminal and the second terminal is a sending terminal, and the first terminal receives indication information sent by the second terminal, where the indication information is used to instruct the first terminal to send a channel quality indicator (CQI) and/or a rank indicator (RI) to the second terminal. In a sidelink communication system of device-to-device communication, the channel quality indicator and the rank indicator are used to implement channel quality feedback between the first terminal and the second terminal. The first terminal completes the channel quality feedback of the first terminal to the second terminal by sending the channel quality indicator and/or the rank indicator to the second terminal.

In step 150, the first terminal generates a media access control layer control element (MAC CE).

The first terminal generates a media access control layer control element (MAC CE), where the MAC CE includes the channel quality indicator and/or the rank indicator. Channel quality feedback is performed through the channel quality indicator and/or the rank indicator.

In step 170, the first terminal sends the MAC CE to the second terminal.

In the sidelink communication system of device-to-device communication, the first terminal sends the MAC CE including the channel quality indicator and/or the rank indicator to the second terminal, and the second terminal receives the MAC CE, so that the channel quality feedback between the first terminal and the second terminal is implemented.

This embodiment realizes that the first terminal sends the channel quality indicator and/or the rank indicator to the second terminal according to the instruction of the indication information sent by the second terminal, realizes the channel quality feedback between devices in device-to-device communication, and realizes the design of the MAC CE in the sidelink communication system, thereby solving the technical problem that channel quality feedback cannot be carried out between devices in device-to-device communication.

In an illustrative embodiment, a specific flow of step 150 in the embodiment corresponding to FIG. 3 includes the following steps in another embodiment:

generate or update the MAC CE according to latest indication information.

After the second terminal sends the indication information to the first terminal, when the second terminal does not receive the MAC CE fed back by the first terminal, the second terminal may also send the indication information used for instructing the first terminal to send the channel quality indicator and/or the rank indicator to the first terminal. After receiving the indication information, the first terminal restarts a timer. The timer is configured to determine whether the channel quality feedback action of generating the MAC CE including the channel quality indicator and/or the rank indicator by the first terminal according to the indication information expires. If the first terminal has generated the MAC CE according to the indication information at this time, the first terminal updates the generated MAC CE according to the latest received indication information. If the first terminal has not generated the MAC CE according to the indication information, the first terminal generates the MAC CE according to the indication information. The indication information may be a channel state information measurement reference signal. The channel state information measurement reference signal is used for the first terminal to obtain the channel quality indicator and/or the rank indicator according to the measurement reference signal. The first terminal measures channel quality according to the channel measurement reference signal, so as to obtain the channel quality indicator and/or the rank indicator according to a measurement result.

This embodiment realizes that the MAC CE including the channel quality indicator and/or the rank indicator is generated or updated according to the latest indication information, and when the second terminal does not receive the feedback, the indication information may be sent to the first terminal again to ensure that the MAC CE for channel quality feedback can be successfully fed back.

In an illustrative embodiment, after step 130 in the embodiment corresponding to FIG. 3 above, the channel quality feedback method may include the following step:

start or restart the timer.

The timer is configured to determine whether the channel quality feedback action of generating the MAC CE including the channel quality indicator and/or the rank indicator by the first terminal according to the indication information expires. After receiving the indication information sent by the second terminal, the first terminal starts or restarts the timer to ensure that the timer can accurately determine whether the channel quality feedback action of generating the MAC CE including the channel quality indicator and/or the rank indicator by the first terminal expires.

Timing duration of the timer is configured in any of the following manners: the timing duration configured by a network, the timing duration configured in advance, the timing duration configured by the second terminal.

The specific flow of step 150 in the embodiment corresponding to FIG. 3 includes the following step in another embodiment:

the first terminal generates the MAC CE when the timer has not expired, or when the timer is running.

When the timer has not expired, or when the timer is running, which means that the channel quality feedback action of generating the MAC CE including the channel quality indicator and/or the rank indicator by the first terminal according to the indication information has not expired. At this time, the first terminal generates the MAC CE according to the indication information.

This embodiment realizes monitoring the channel quality feedback action through the timer.

In an illustrative embodiment, the channel quality feedback method may include the following step:

the first terminal cancels or stops generating the MAC CE when the timer expires.

When the timer expires, the first terminal determines that the channel quality feedback action has expired. At this time, the first terminal stops generating the MAC CE and/or cancels generating the MAC CE.

In an illustrative embodiment, after step 150 or step 170 in the embodiment corresponding to FIG. 3 above, the channel quality feedback method may include the following step:

stop the timer.

After the MAC CE including the channel quality indicator and/or the rank indicator is generated, which means that the channel quality feedback action of generating the MAC CE including the channel quality indicator and/or the rank indicator by the first terminal has been completed, the timer is stopped at this time.

Or, after the MAC CE including the channel quality indicator and/or the rank indicator is sent, which means that the channel quality feedback action of generating the MAC CE including the channel quality indicator and/or the rank indicator by the first terminal has been completed, and the timer is stopped at this time.

In an illustrative embodiment, the channel quality indicator includes:

a channel quality indicator conditioned on a rank indicated by the rank indicator and/or a channel quality indicator conditioned on a rank not indicated by the rank indicator.

The channel quality indicator may include the channel quality indicator conditioned on the rank indicated by the rank indicator and/or the channel quality indicator conditioned on the rank not indicated by the rank indicator. In an illustrative specific embodiment, when the rank indicated by the rank indicator is 1, the channel quality indicator may include a channel quality indicator conditioned on the rank of 1, and may also include a channel quality indicator when the rank is not 1.

In an illustrative embodiment, the channel quality indicator includes:

the channel quality indicator conditioned on at least one rank.

The channel quality indicator includes the channel quality indicator conditioned on at least one rank. In an illustrative specific embodiment, the channel quality indicator may be a channel quality indicator conditioned on a rank of 1, may be a channel quality indicator conditioned on a rank of 2, or may be channel quality indicators conditioned on ranks of 1 and 2. The rank is configured in any of the following manners: the rank configured by a network or the rank configured in advance or the rank configured by the second terminal.

In an illustrative embodiment, the channel quality feedback method may include the following step:

configure a logical channel identity LCID corresponding to the MAC CE.

The logical channel identity (LCID) is used to indicate that the MAC CE includes the channel quality indicator and/or the rank indicator. LCID is data in a medium access control protocol data unit (MAC PDU) corresponding to the MAC CE, and one LCID corresponds to one MAC CE. One LCID may be used to send information of including the channel quality indicator and/or the rank indicator, or two LCIDs may be used to send information of including the channel quality indicator and the rank indicator, respectively. The LCID includes an LCID for indicating that the MAC CE includes the channel quality indicator and an LCID for indicating that the MAC CE includes the rank indicator. One LCID is used for indicating that the MAC CE includes the channel quality indicator and one LCID is used for indicating that the MAC CE includes the rank indicator. The LCID is used to indicate an MAC CE including the channel quality indicator conditioned on at least one rank. In an illustrative specific embodiment, the LCID may be used to indicate an MAC CE including a channel quality indicator conditioned on a rank of 1, may also be used to indicate an MAC CE including a channel quality indicator conditioned on a rank of 2, and may also indicate an MAC CE including channel quality indicators conditioned on ranks of 1 and 2.

The LCID is also used to indicate an MAC CE including at least one rank indicator. In an illustrative specific embodiment, the LCID may be used to indicate an MAC CE which includes a rank indicator indicating a rank of 1 or an MAC CE which includes a rank indicator indicating a rank of 2.

The LCID is configured in any of the following manners: the LCID configured by a network, the LCID configured in advance, the LCID configured by the second terminal.

In an illustrative embodiment, the channel quality feedback method may include the following step:

determine a priority.

The priority is used to, when a medium access control protocol data unit MAC PDU carrying the MAC CE is generated, determine a priority order of the MAC CE and other data than the MAC CE in the MAC PDU; and/or, the priority is used to determine priority indication information included in a physical layer control channel when the MAC PDU is transmitted.

The MAC PDU includes the MAC CE and the LCID corresponding to the MAC CE. The first terminal sends the MAC CE including the channel quality indicator and/or the rank indicator to the second terminal by sending the MAC PDU to the second terminal. The priority is used to determine the priority order of the MAC CE and other data in the MAC PDU when the MAC PDU is generated, and/or determine the priority indication information included in the physical layer control channel when the MAC PDU including the MAC CE is transmitted, where the priority indication information is the priority of sending the MAC PDU.

The priority is configured in any of the following manners: the priority defined by a protocol, the priority configured by a network, the priority configured in advance, the priority configured by the second terminal.

The embodiment realizes determining, through the priority, the priority order between the MAC CE and other data in the MAC PDU, and/or the priority indication information included in the physical layer control channel.

In an illustrative embodiment, the channel quality feedback method may include the following step:

determine a hybrid automatic repeat request attribute of the MAC CE.

The hybrid automatic repeat request (HARM) attribute includes: whether to require a hybrid automatic repeat request feedback, and/or different hybrid automatic repeat request feedback modes. In an illustrative specific embodiment, the hybrid automatic repeat request attribute may be a range in which a terminal needs to perform hybrid automatic repeat request HARQ feedback, i.e., feedback of acknowledgement (ACK) or negative acknowledgement (NACK), and it is also possible to feedback ACK or NACK on a same feedback resource, or feedback ACK or NACK on different feedback resources.

This embodiment realizes determining feedback status of the hybrid automatic repeat request according to the hybrid automatic repeat request attribute.

Figure 4:
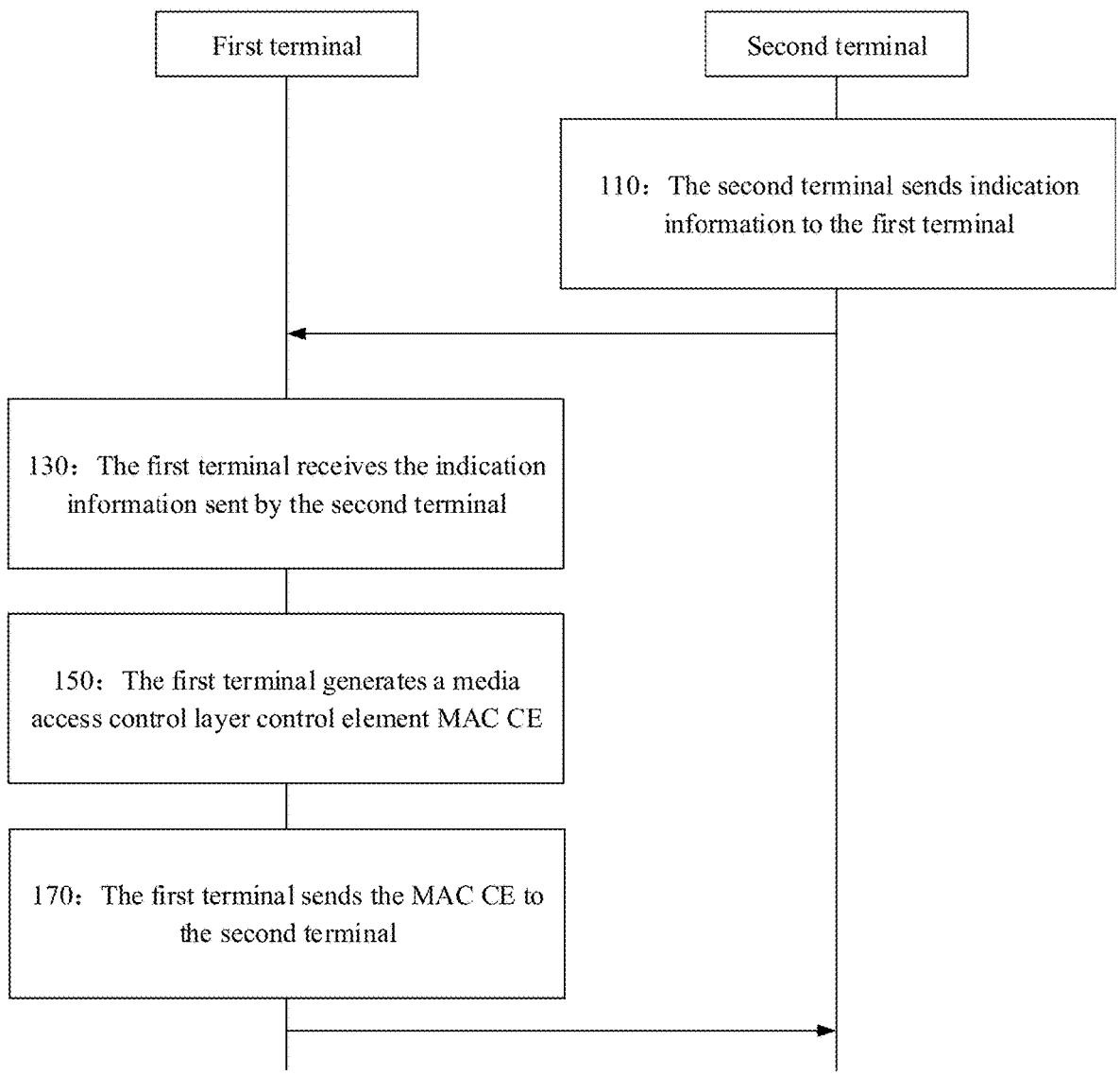
FIG. 4 is a flowchart of a channel quality feedback method according to an embodiment of the present application.

FIG. 4 is a flowchart of a channel quality feedback method according to an embodiment of the present application. As shown in FIG. 4, the method includes the following steps.

In step 110, a second terminal sends indication information to a first terminal.

In step 130, the first terminal receives the indication information sent by the second terminal.

After receiving the indication information sent by the second terminal, the first terminal starts or restarts a timer. Timing duration of the timer is configured in any of the following manners: the timing duration configured by a network, the timing duration configured in advance, the timing duration configured by the second terminal. The first terminal generates the MAC CE when the timer has not expired, or when the timer is running. The first terminal cancels or stops generating the MAC CE when the timer expires.

In step 150, the first terminal generates a media access control layer control element (MAC CE).

After the second terminal sends the indication information to the first terminal, when the second terminal does not receive the MAC CE fed back by the first terminal, the first terminal may also receive the indication information sent by the second terminal, and at this time, the timer is restarted, and the first terminal generates or updates the MAC CE according to the latest indication information.

In an illustrative specific embodiment, a channel quality indicator and/or a rank indicator may be transmitted by one MAC CE. At this time, when both the channel quality indicator and the rank indicator are included in the MAC CE, the channel quality indicator includes the channel quality indicator conditioned on a rank indicated by the rank indicator and/or the channel quality indicator conditioned on a rank not indicated by the rank indicator. When the MAC CE includes only a channel quality indicator or a rank indicator, it is needed to configure a logical channel identity (LCID) of at least one byte corresponding to the MAC CE, where the LCID is used to indicate whether the MAC CE includes the channel quality indicator or the rank indicator. When the MAC CE includes only the channel quality indicator, the channel quality indicator includes the channel quality indicator conditioned on at least one rank. When the MAC CE includes only the rank indicator, the MAC CE including at least one rank indicator needs to be indicated through the LCID, and the MAC CE including the channel quality indicator conditioned on at least one rank needs to be indicated through the LCID.

In an illustrative specific embodiment, the channel quality indicator and the rank indicator may be sent by two MAC CEs. At this time, the logical channel identity (LCID) corresponding to the MAC CE needs to be configured, which is used to indicate whether the channel quality indicator or the rank indicator is included in the MAC CE. The channel quality indicator includes a channel quality indicator conditioned on a rank indicated by the rank indicator and/or a channel quality indicator conditioned on a rank not indicated by the rank indicator. The LCID is configured in any of the following manners: the LCID configured by a network, the LCID configured in advance, the LCID configured by the second terminal.

In step 170, the first terminal sends the MAC CE to the second terminal.

When the first terminal sends the MAC CE to the second terminal, a priority is determined, where the priority is used to, when a medium access control protocol data unit (MAC PDU) carrying the MAC CE is generated, determine a priority order of the MAC CE and other data than the MAC CE in the MAC PDU; and/or, the priority is used to determine priority indication information included in a physical layer control channel when the MAC PDU is transmitted. The priority is configured in any of the following manners: the priority defined by a protocol, the priority configured by a network, the priority configured in advance, the priority configured by the second terminal. When the first terminal sends the MAC CE to the second terminal, a hybrid automatic repeat request attribute of the MAC CE is determined, where the hybrid automatic repeat request attribute includes: whether to require a hybrid automatic repeat request feedback, and/or different hybrid automatic repeat request feedback modes.

Figure 5:
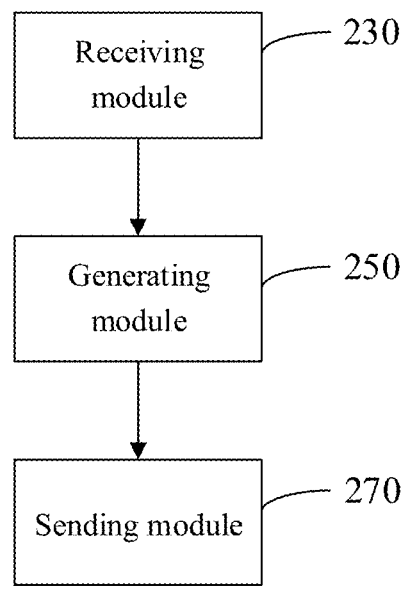
FIG. 5 is an apparatus block diagram for implementing the channel quality feedback method according to various embodiments of the present disclosure.

FIG. 5 is an apparatus block diagram for implementing the channel quality feedback method according to various embodiments of the present disclosure. As shown in FIG. 5, the apparatus includes, but is not limited to, a receiving module 230, a generating module 250 and a sending module 270.

The receiving module 230 is configured to receive indication information sent by a second terminal, where the indication information is used to instruct the first terminal to send a channel quality indicator and/or a rank indicator to the second terminal.

The generating module 250 is configured to generate a media access control layer control element (MAC CE), where the MAC CE includes the channel quality indicator and/or the rank indicator.

The sending module 270 is configured to send the MAC CE to the second terminal.

The implementation process of the functions and roles of various modules in this embodiment and other part not described or defined in detail are described in the above embodiments and will not be repeated here.

In an illustrative embodiment, the generating module 250 is further configured to:
  generate or update the MAC CE according to latest indication information.

In an illustrative embodiment, the channel quality feedback apparatus further includes:
  a timer starting module, configured to start or restart a timer; and
  the generating module 250 is further configured to:
  generate the MAC CE when the timer has not expired, or when the timer is running.

In an illustrative embodiment, the channel quality feedback apparatus further includes:
  a stopping module, configured to cancel or stop generating the MAC CE when the timer expires.

In an illustrative embodiment, the channel quality feedback apparatus further includes:
  a timer stopping module, configured to stop the timer.

In an illustrative embodiment, timing duration of the timer is configured in any of the following manners:
  the timing duration configured by a network, the timing duration configured in advance, the timing duration configured by the second terminal.

In an illustrative embodiment, the channel quality indicator includes:
  a channel quality indicator conditioned on a rank indicated by the rank indicator and/or a channel quality indicator conditioned on a rank not indicated by the rank indicator.

In an illustrative embodiment, the channel quality indicator includes:
the channel quality indicator conditioned on at least one rank.

In an illustrative embodiment, the channel quality feedback apparatus further includes:
a configuring module, configured to configure a logical channel identity (LCID) corresponding to the MAC CE, where the LCID is used to indicate that the MAC CE includes the channel quality indicator and/or the rank indicator.

In an illustrative embodiment, the LCID includes:
an LCID used to indicate that the MAC CE includes the channel quality indicator and an LCID used to indicate that the MAC CE includes the rank indicator.

In an illustrative embodiment, the LCID is used to indicate the channel quality indicator conditioned on at least one rank.

In an illustrative embodiment, the LCID is used to indicate a MAC CE including at least one rank indicator.

In an illustrative embodiment, the LCID is configured in any of the following manners:
the LCID configured by a network, the LCID configured in advance, the LCID configured by the second terminal.

In an illustrative embodiment, the channel quality feedback apparatus further includes:
a determining module, configured to determine a priority, where the priority is used to, when a medium access control protocol data unit (MAC PDU) carrying the MAC CE is generated, determine a priority order of the MAC CE and other data than the MAC CE in the MAC PDU; and/or,
the priority is used to determine priority indication information included in a physical layer control channel when the MAC PDU is transmitted.

In an illustrative embodiment, the priority is configured in any of the following manners: the priority defined by a protocol, or the priority configured by a network, the priority configured in advance, or the priority configured by the second terminal.

In an illustrative embodiment, the channel quality feedback apparatus further includes:
an attribute determining module, configured to determine a hybrid automatic repeat request attribute of the MAC CE.

In an illustrative embodiment, the hybrid automatic repeat request attribute includes:
whether to require a hybrid automatic repeat request feedback, and/or different hybrid automatic repeat request feedback modes.

For the implementation process of the functions and roles of various modules in the above apparatus, please refer to the implementation process of corresponding steps in any channel quality feedback method provided by the above specific embodiments, which will not be repeated here.

Figure 6:
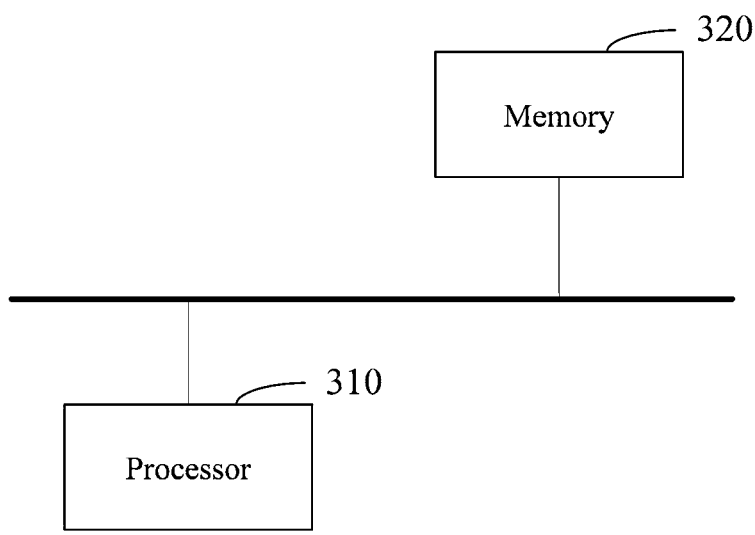
FIG. 6 is a schematic hardware structural diagram of a channel quality feedback apparatus provided by an embodiment of the present application.

FIG. 6 is a hardware structural diagram of an apparatus for channel quality feedback provided by an embodiment of the present application. As shown in FIG. 6, a terminal device includes a processor 310 and a memory 320. Communication connection between the above components of the terminal device may be implemented through a bus system.

The processor 310 may also be an independent component, or may be a collective name for multiple processing elements. For example, it may be a central processing unit (CPU), an application specific integrated circuit (ASIC), or one or more integrated circuits configured to implement the above method, such as at least one digital signal processor (DSP), or at least one field programmable gate array (FPGA), etc.

The memory 320 stores a program which is runnable on the processor 310, and when the processor 310 executes the program, part or all of the steps of the channel quality feedback method in the specific embodiments of the above method are implemented.

A specific embodiment of the present application also provides a computer-readable storage medium, where the computer-readable storage medium stores a computer program, and when the computer program is executed, part or all of the steps of the channel quality feedback method as described in the above specific embodiments of the method are implemented.

A specific embodiment of the present application also provides a computer program product, where the computer program product is stored in a non-transitory computer-readable storage medium, and when the computer program is executed, part or all of the steps of the channel quality feedback method as described in the above specific embodiments of the method are implemented. The computer program product may be a software installation package.

A specific embodiment of the present application also provides a chip including a processor configured to call a computer program from a memory and run the computer program, and a device installed with the chip executes part or all of the steps of the channel quality feedback method as described in the above specific embodiments of the method.

A specific embodiment of the present application also provides a computer program, and when the computer program is executed, part or all of the steps of the channel quality feedback method as described in the above specific embodiments of the method are implemented.

The steps of the method or algorithm described in the specific embodiments of the present application may be implemented in a hardware manner, or may be implemented in a manner in which a processor executes software instructions. Software indications may be composed of corresponding software modules, the software modules may be stored in a random access memory (RAM), a flash memory, a read only memory (ROM), an erasable programmable read only memory (EPROM), an electrically erasable programmable read only memory (EEPROM), a register, a hard disk, a portable hard disk, a compact disc read-only memory (CD-ROM), or any other form of storage medium well known in the art. An illustrative storage medium is coupled to the processor so that the processor can read information from the storage medium and can write information to the storage medium. Of course, the storage medium may also be an integral part of the processor. The processor and storage medium may be located in an ASIC. In addition, the ASIC may be located in an access network device, a target network device, or a core network device. Of course, the processor and the storage medium may also exist in the access network device, the target network device or the core network device as discrete components.

Those skilled in the art should appreciate that in one or more of the above examples, the functions described in the specific embodiments of the present application may be implemented in whole or in part by software, hardware, firmware or any combination thereof. When implemented by software, it may be implemented in the form of a computer program product in whole or in part. The computer program product includes one or more computer instructions. When the computer program instructions are loaded and executed on a computer, the processes or functions described in the specific embodiments of the present application are generated in whole or in part. The computer may be a general-purpose computer, a special-purpose computer, a computer network, or other programmable devices. The computer instructions may be stored in a computer-readable storage medium or transmitted from a computer-readable storage medium to another. For example, the computer instructions may be transmitted from a website, a computer, a server or a data center to another website, computer, server or data center through a wired (such as coaxial cable, optical fiber, digital subscriber line (DSL)) or wireless (such as infrared, wireless, microwave, etc.) manner. The computer-readable storage medium may be any available medium that can be accessed by a computer, or a data storage device such as a server, a data center, etc. integrated with one or more available media. The available medium may be a magnetic medium (for example, a floppy disk, a hard disk, a magnetic tape), an optical media (for example, a digital video disc (DVD)), or a semiconductor media (for example, a solid state disk (SSD)), etc.

The specific embodiments described above further detail the purpose, technical solution and beneficial effects of the specific embodiments of the present application. It should be understood that the above are only the specific embodiments of the present application and are not used to limit the protection scope of the specific embodiments of the present application. Any modification, equivalent replacement, improvement, etc. made on the basis of the technical solutions of the specific embodiments of the present application shall be included in the protection scope of the specific embodiments of the present application.

It should be understood that the present application is not limited to the precise structure that has been described above and shown in the drawings, and various modifications and changes may be performed without departing from its scope. The scope of the present application is limited only by the appended claims.

What is claimed is:

1. A channel quality feedback method, comprising:
    receiving, by a first terminal, indication information sent by a second terminal, wherein the indication information is used to instruct the first terminal to send a channel quality indicator and a rank indicator to the second terminal;
    generating, by the first terminal, a media access control layer control element (MAC CE), wherein the MAC CE comprises the channel quality indicator and the rank indicator; and
    sending, by the first terminal, the MAC CE to the second terminal;
    wherein after the receiving, by the first terminal, the indication information sent by the second terminal, the method further comprises:
    starting a timer; and
    the generating, by the first terminal, the media access control layer control element (MAC CE), comprises:
    generating, by the first terminal, the MAC CE in the case that the timer does not expire.

2. The method according to claim 1, wherein the method further comprises:
    canceling, by the first terminal, generating the MAC CE when the timer expires.

3. The method according to claim 1, wherein after the generating, by the first terminal, the media access control layer control element (MAC CE), the method further comprises:
    stopping the timer.

4. The method according to claim 1, wherein timing duration of the timer is configured by the second terminal.

5. The method according to claim 1, wherein the channel quality indicator comprises:
    a channel quality indicator conditioned on a rank indicated by the rank indicator.

6. The method according to claim 1, wherein the method further comprises:
    generating, by the first terminal, a medium access control protocol data unit MAC PDU carrying the MAC CE based on a priority order of the MAC CE and other data than the MAC CE in the MAC PDU.

7. The method according to claim 6, wherein the priority is defined by a protocol.

8. The method according to claim 1, wherein the method further comprises:
    determining a hybrid automatic repeat request attribute of the MAC CE.

9. The method according to claim 8, wherein the hybrid automatic repeat request attribute comprises:
    whether a hybrid automatic repeat request feedback (HARQ) is enabled.

10. The method according to claim 1, wherein the MAC CE is identified by a logical channel identity (LCID).

11. A channel quality feedback apparatus, comprising a processor and a memory, wherein the memory stores a program which is runnable on the processor, and the processor, when executing the program, is configured to:
    receive indication information sent by a second terminal, wherein the indication information is used to instruct the first terminal to send a channel quality indicator and a rank indicator to the second terminal;
    generate a media access control layer control element (MAC CE), wherein the MAC CE comprises the channel quality indicator and the rank indicator; and
    send the MAC CE to the second terminal;
    wherein the processor is further configured to:
    start a timer; and
    generate the MAC CE in the case that the timer does not expire.

12. The apparatus according to claim 11, wherein the processor is further configured to:
    cancel generating the MAC CE when the timer expires.

13. The apparatus according to claim 11, wherein the processor is further configured to:
    stop the timer.

14. The apparatus according to claim 11, wherein timing duration of the timer is configured by the second terminal.

15. The apparatus according to claim 11, wherein the channel quality indicator comprises:
    a channel quality indicator conditioned on a rank indicated by the rank indicator.

16. The apparatus according to claim 11, wherein the processor is further configured to:
    generate a medium access control protocol data unit MAC PDU carrying the MAC CE based on a priority order of the MAC CE and other data than the MAC CE in the MAC PDU.

17. A non-transitory computer-readable storage medium storing a computer program, wherein when the computer program is executed, the following operations are implemented:
    receiving, by a first terminal, indication information sent by a second terminal, wherein the indication information is used to instruct the first terminal to send a channel quality indicator and a rank indicator to the second terminal;

generating, by the first terminal, a media access control layer control element (MAC CE), wherein the MAC CE comprises the channel quality indicator and the rank indicator; and sending, by the first terminal, the MAC CE to the second terminal;

wherein after the receiving, by the first terminal, the indication information sent by the second terminal, the following operation is implemented:

starting a timer; and the generating, by the first terminal, the media access control layer control element (MAC CE), comprises:

generating, by the first terminal, the MAC CE in the case that the timer does not expire.

18. A chip, wherein the chip comprises a processor, configured to call a computer program from a memory and run the computer program, and a device installed with the chip executes the channel quality feedback method according to claim 1.

* * * * *